(12) United States Patent
Radovcic et al.

(10) Patent No.: US 8,929,422 B2
(45) Date of Patent: Jan. 6, 2015

(54) CLOCK DISTRIBUTION ARCHITECTURE FOR DUAL INTEGRATED CORE ENGINE TRANSCEIVER FOR USE IN RADIO SYSTEM

(75) Inventors: Boris Radovcic, Rockaway, NJ (US); Michael S. Vogas, Morristown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/465,269

(22) Filed: May 7, 2012

(65) Prior Publication Data
US 2012/0287977 A1 Nov. 15, 2012

Related U.S. Application Data

(60) Provisional application No. 61/484,041, filed on May 9, 2011.

(51) Int. Cl.
*H04B 13/02* (2006.01)
*H04L 7/00* (2006.01)

(52) U.S. Cl.
CPC .................................. *H04L 7/0008* (2013.01)
USPC ........................................................ 375/222

(58) Field of Classification Search
CPC ..... H04L 7/04; H04L 25/4927; H04L 5/1438; H04L 27/00; H04L 27/2608; H04B 1/38; H04B 15/00; H04M 11/06; H04M 11/062
USPC ........ 375/222, 259, 340, 356, 376; 455/41.2, 455/63.1
See application file for complete search history.

(56) References Cited

U.S. PATENT DOCUMENTS

| 8,619,931 | B1 * | 12/2013 | Pham et al. ................... 375/355 |
| 2005/0119025 | A1 * | 6/2005 | Mohindra et al. ......... 455/552.1 |
| 2007/0054629 | A1 * | 3/2007 | Maligeorgos et al. .......... 455/88 |
| 2010/0150255 | A1 * | 6/2010 | Konishi et al. ................ 375/259 |
| 2011/0076945 | A1 * | 3/2011 | Chang et al. ................. 455/41.2 |
| 2011/0117854 | A1 * | 5/2011 | Ruelke et al. ................ 455/63.1 |

* cited by examiner

*Primary Examiner* — Syed Haider
(74) *Attorney, Agent, or Firm* — Daniel J. Long

(57) ABSTRACT

A method and apparatus of minimizing corruption of a reference clock to a RF circuitry in a radio system is disclosed. A DICE-T receives a reference clock in a Low Voltage Differential Signal (LVDS) format from a GVA. The DICE-T personality card converts the reference clock signal into an analog signal. The analog signal is supplied to the Core Engine RF card and the LVDS format signal is supplied to the Core Engine modem for local clocking. The Core Engine RF feeds the analog signal into a programmable phase locked loop chip to generate all the clocks required for RF processing. The analog signal is also used to provide the clocks to the ADC and DAC of core engine modem. By routing the reference clock directly to the RF card then deriving the modem clocks, the phase noise of the reference clock is reduced.

10 Claims, 5 Drawing Sheets

Prior-Art

CLOCK DISTRIBUTION ARCHITECTURE FOR DUAL INTEGRATED CORE ENGINE TRANSCEIVER FOR USE IN RADIO SYSTEM

CROSS-REFERENCE TO RELATED APPLICATIONS

This Application claims rights under 35 USC §119(e) from U.S. application Ser. No. 61/484,041 filed May 9, 2011, the contents of which are incorporated herein by reference.

TECHNICAL FIELD

Embodiments are generally related to radio systems. Embodiments are also related to a method for clock distribution in a radio system. Embodiments are additionally related to clock distribution architecture for Dual Core Integrated Core Engine Transceiver (DICE-T) for use in radio system. Embodiments are additionally related to a method and apparatus of providing clean reference clock to RF circuitry and then providing reference clock to the modem in a radio system.

BACKGROUND OF THE INVENTION

Radio systems have many modular electronics systems for providing radio communications to and from vehicles for example military vehicles and the like. The existing Ground Mobile Radio (GMR) Ground Vehicle Aerodynamics (GVA) was designed to accommodate modules such as power amplifiers, transceivers, and Platform Interface Modules (PIM). In such radio systems a Dual Integrated Core Engine Transceiver (DICE-T) or similar devices have strict requirements for system clock. The core engine modem and core engine RF in DICE-T utilizes 10 MHz reference clock from a Ground Vehicle Adapter (GVA) to meet Radio Frequency (RF) output requirements.

Referring to FIG. 1, simple clock distribution architecture 100 of a DICE-T module 108 in a radio system is disclosed. A 10 MHz reference signal 108 is supplied to a core engine modem 104 and a core engine RF 106 in DICE-T module 108 from GVA 102. The core engine modem 104 generates a noise signal which affects the reference clock signal of core engine RF 106 and hence affects the performance of RF circuits. By simultaneously sending the clock signal 108 to core engine modem 104 and core engine RF 106, the RF performance is reduced and spurious noise is increased. Also, the ADC and DAC in core engine modem receive fixed unchangeable frequency from GVA irrespective of waveform requirements. This increases the power consumption when high sample rates are not required.

A need, therefore, exists for an apparatus and method for improved clock distribution architecture in radio systems. Such apparatus and method should minimize the corruption of the reference clock to the RF circuitry by reducing phase noise of the reference clock signal. Also, the apparatus should allow RF card to change the frequency of the ADC and DAC clocks to the modem, depending upon the waveform requirements

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for radio systems.

It is another aspect of the disclosed embodiments to provide for methods for clock distribution in radio systems.

It is yet another aspect of the disclosed embodiments to provide for clock distribution architecture for dual core integrated core engine transceiver for use in radio system.

It is a further aspect of the present invention to provide a method and apparatus of providing clean reference clock to RF circuitry and then providing reference clock to the modem in a radio system.

It is another aspect of the present invention to provide for method and apparatus of minimizing the corruption of the reference clock to the RF circuitry It is a yet another aspect of the present invention to provide to convert incoming clock to a clean analog signal in the DICE circuit card and sending it to the RF card directly thereby bypassing the noisy digital modem circuitry.

The aforementioned aspects and other objectives and advantages can now be achieved as described herein. The reference clock is provided to the DICE-T by the GVA in Low Voltage Differential Signal (LVDS) format. The DICE personality card converts this signal into an analog version to provide to the Core Engine RF card and an LVDS copy. The LVDS copy is provided to the Core Engine modem for local clocking. The Core Engine RF feeds the analog 10 MHz into a programmable phase locked loop chip to generate all the clocks required for RF processing. The analog 10 MHz is also used to provide the clocks to the Core Engine Modem ADC and DAC. By routing the reference clock directly to the RF card then deriving the modem clocks, the phase noise of the 10 MHz reference is reduced. This translates to improved RF performance and decreased spurious noise. Another advantage is that depending upon waveform requirements, the RF card can change the frequency of the ADC and DAC clocks to the modem decreasing power consumption when high sample rates are not required.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
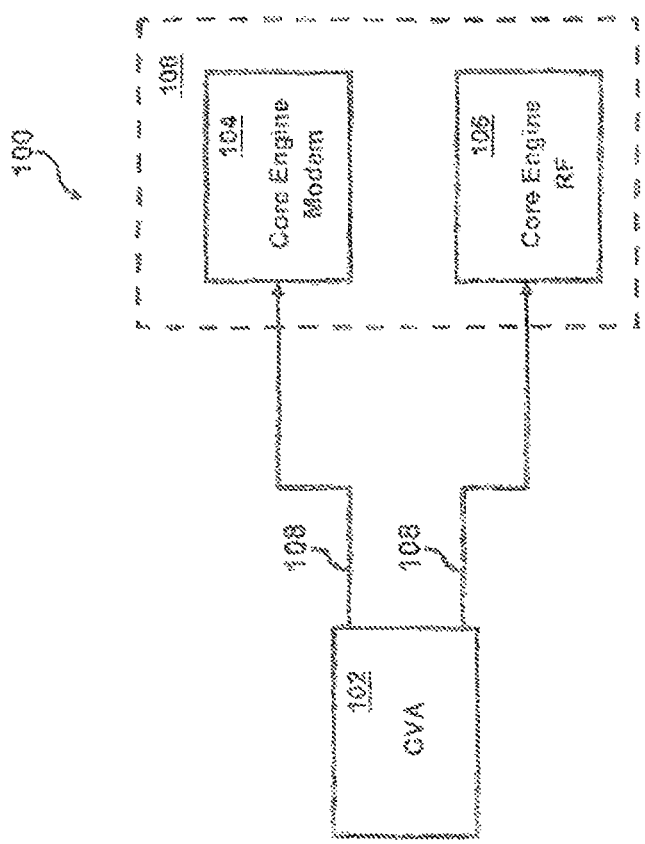
FIG. 1 illustrates a simplified block diagram of an apparatus for clock distribution in a conventional radio system.
Figure 2:
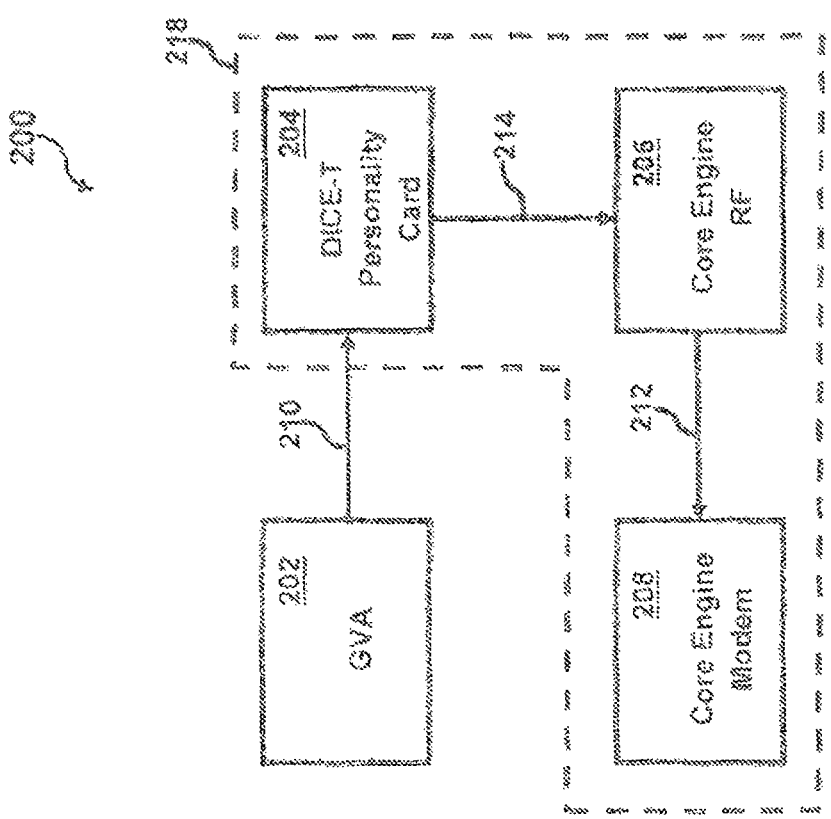
FIG. 2 illustrates a simplified block diagram of an apparatus for clock distribution in a radio system, in accordance with the disclosed embodiments.

FIG. 2 illustrates a simplified block diagram of an apparatus for clock distribution in a radio system, in accordance with the disclosed embodiments. The DICE-T 218 includes a DICE-T personality card 204, a core engine RF and a core engine Modem. The DICE-T personality card 204 receives a reference clock signal 210 from a GVA 202 and converts the reference signal to a clean analog clock signal 214. The core engine RF utilizes the clean analog clock signal 214 for generating the clocks required for RF processing. After sending the clean analog clock signal 214 to the core engine RF 206, the clock signal 212 for core engine modem 208 is derived from the core engine RF 206. By deriving the clock signal 212 from the core engine RF 206 to core engine modem 208, the phase noise of the reference clock signal is reduced.

Figure 3:
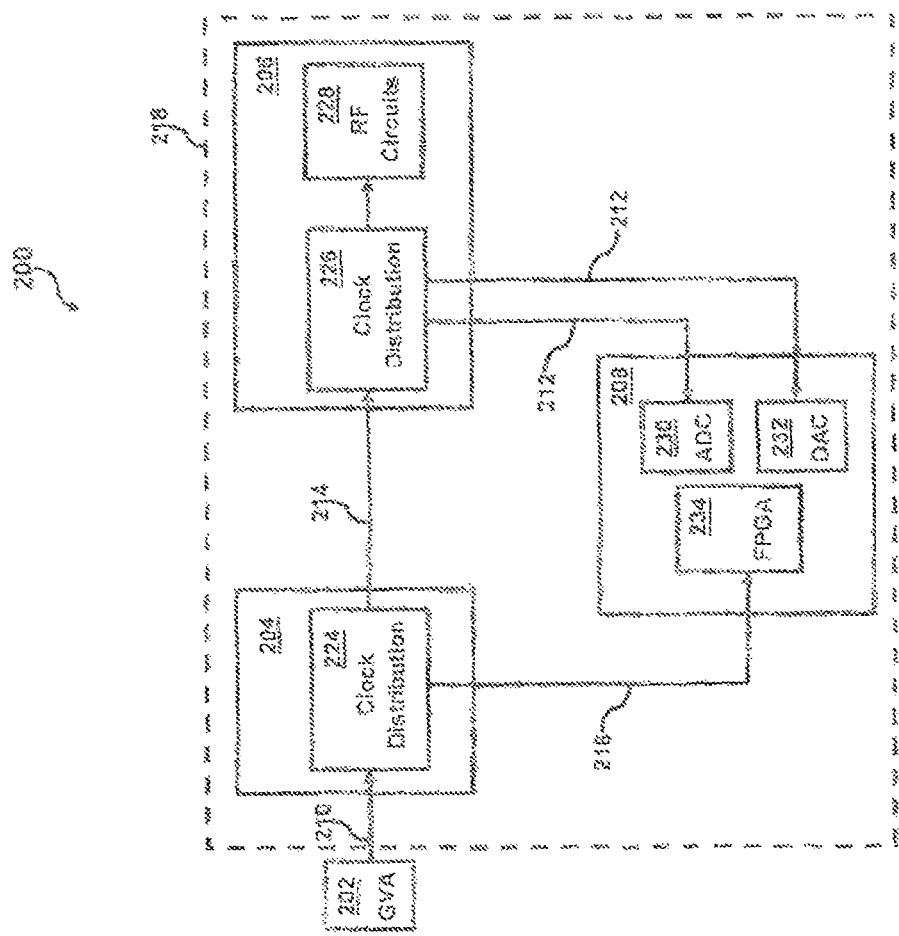
FIG. 3 illustrates a detailed block diagram of an apparatus for clock distribution in a radio system, in accordance with the disclosed embodiments.

Referring to FIG. 3, the reference clock signal 210 is provided to the DICE-T 218 by the GVA 202 in Low Voltage Differential Signal (LVDS) format. The DICE personality card 204 converts the signal into an analog signal 214 to provide to the Core Engine RF 206. The LVDS copy 216 is provided to a FPGA of the Core Engine modem 208 for local clocking.

Figure 4:
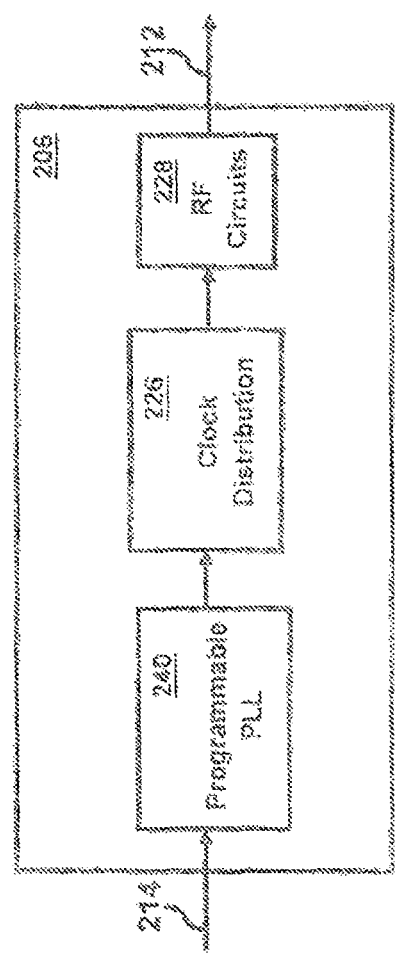
FIG. 4 illustrates a block diagram of a core engine RF in a radio system, in accordance with the disclosed embodiments.

The Core Engine RF 206 feeds the analog signal 214 into a programmable phase locked loop chip 240 depicted in FIG. 4, to generate all the clocks required for RF processing. The analog signal 212 from core engine RF 206 is used to provide the clocks to an ADC 230 and DAC 232 of Core Engine Modem 208 depicted in FIG. 3. By routing the reference clock signal 214 directly to the core engine RF 206 and then deriving the core clocks for the core engine modem 208, the phase noise of the reference clock 214 is reduced. This translates to improved RF performance and decreased spurious noise. Also, depending upon waveform requirements, the core engine RF 206 can change the clocks frequency of the ADC 230 and the DAC 232 and hence decreasing power consumption when high sample rates are not required.

Figure 5:
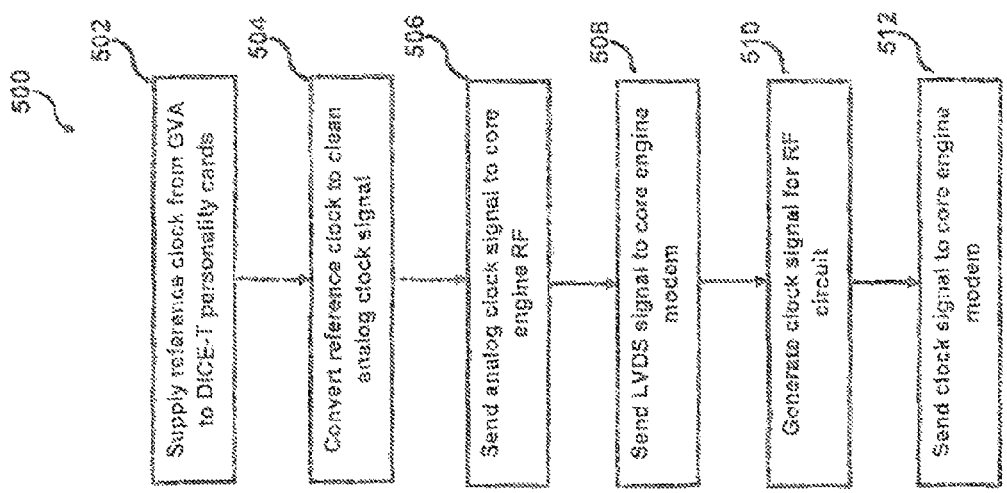
FIG. 5 illustrates a flow chart showing a method of distributing clock in a radio system, in accordance with the disclosed embodiments.

FIG. 5 illustrates a flow chart 500 showing a method of distributing clock in a radio system, in accordance with the disclosed embodiments. As illustrated at block 502, reference clock signal from GVA is supplied to DICE-T personality cards. The GVA supplies the reference clock signal in GVA in Low Voltage Differential Signal (LVDS) format. The DICE-T personality card converts the reference clock signal to a clean analog reference signal as said at block 504. The clean analog clock Send analog reference clock signal is first send to core engine RF as depicted at block 506. The DICE-T personality card sends a LVDS copy of reference clock signal to core engine modem as illustrated at block 508. Then as said at block 510, the core engine RE generates the clock signal for RF circuit. Finally, the dock signal for core engine modem is derived from the core engine RF as depicted at block 512.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for clock distribution in a radio system comprising:
   converting an analog reference clock signal to a clean analog reference clock signal;
   sending said clean analog reference clock signal to a radio frequency card to bypass noisy digital modem circuitry;
   causing said radio frequency card to generate one or more radio frequency clocks required for radio frequency (RF) processing and one or more core engine modem clocks based on said clean analog reference clock signal;
   providing the one or more core engine modem clocks to a core engine modem,
   wherein the core engine modem includes an analog-to-digital converter (ADC) and digital-to-analog converter (DAC),
   wherein the radio frequency card changes the frequency of the ADC and DAC clocks when high sample rates are not required; and
   providing a low voltage differential signal to said core engine modem, wherein a personality card supplies said low voltage differential signal to said core engine modem for local clocking wherein said low voltage differential signal is a copy of said analog reference clock signal.

2. The method of claim 1 wherein said analog reference clock signal is obtained from a ground vehicle adapter.

3. The method of claim 1 wherein the personality card in a transceiver of said radio system converts said analog reference clock signal to said clean analog reference clock signal.

4. The method of claim 3 wherein said transceiver comprises a Dual Core Integrated Core Engine Transceiver (DICE-T).

5. The method of claim 1 wherein by routing said clean analog reference clock signal to said radio frequency card and then deriving clock for said core engine modem, the phase noise of the reference clock signal is reduced.

6. An apparatus for clock distribution in a radio system comprising:
   a personality card in a transceiver of said radio system converts an analog reference clock signal to a clean analog reference clock signal;
   a radio frequency card receives said clean analog reference clock signal to bypass noisy digital modem circuitry, wherein said radio frequency card generates one or more core engine modem clocks and one or more radio frequency clocks required for radio frequency (RF) processing based on said clean analog reference clock signal; and
   provide the one or more core engine modem clocks to a core engine modem,
   wherein the core engine modem includes an analog-to-digital converter (ADC) and digital-to-analog converter (DAC),
   wherein the radio frequency card changes the frequency of the ADC and DAC clocks when high sample rates are not required; and
   said core engine modem receives a low voltage differential signal from the personality card in order to perform local clocking, wherein said low voltage differential signal is a copy of said analog reference clock signal.

7. The apparatus of claim 6 wherein said analog reference clock signal is obtained from a ground vehicle adapter.

8. The apparatus of claim 6 wherein said transceiver comprises a Dual Core Integrated Core Engine Transceiver (DICE-T).

9. The apparatus of claim 6 wherein by routing said clean analog reference clock signal to said radio frequency card and then deriving clock for said core engine modem, the phase noise of the reference clock signal is reduced.

10. The method of claim 1 further comprises providing the one or more core engine modem clocks to an analog to digital convertor and a digital to analog convertor of the core engine modem for conversion.

* * * * *